Feb. 5, 1952    F. R. McFARLAND    2,584,965
TRANSMISSION
Filed April 5, 1946    5 Sheets-Sheet 1
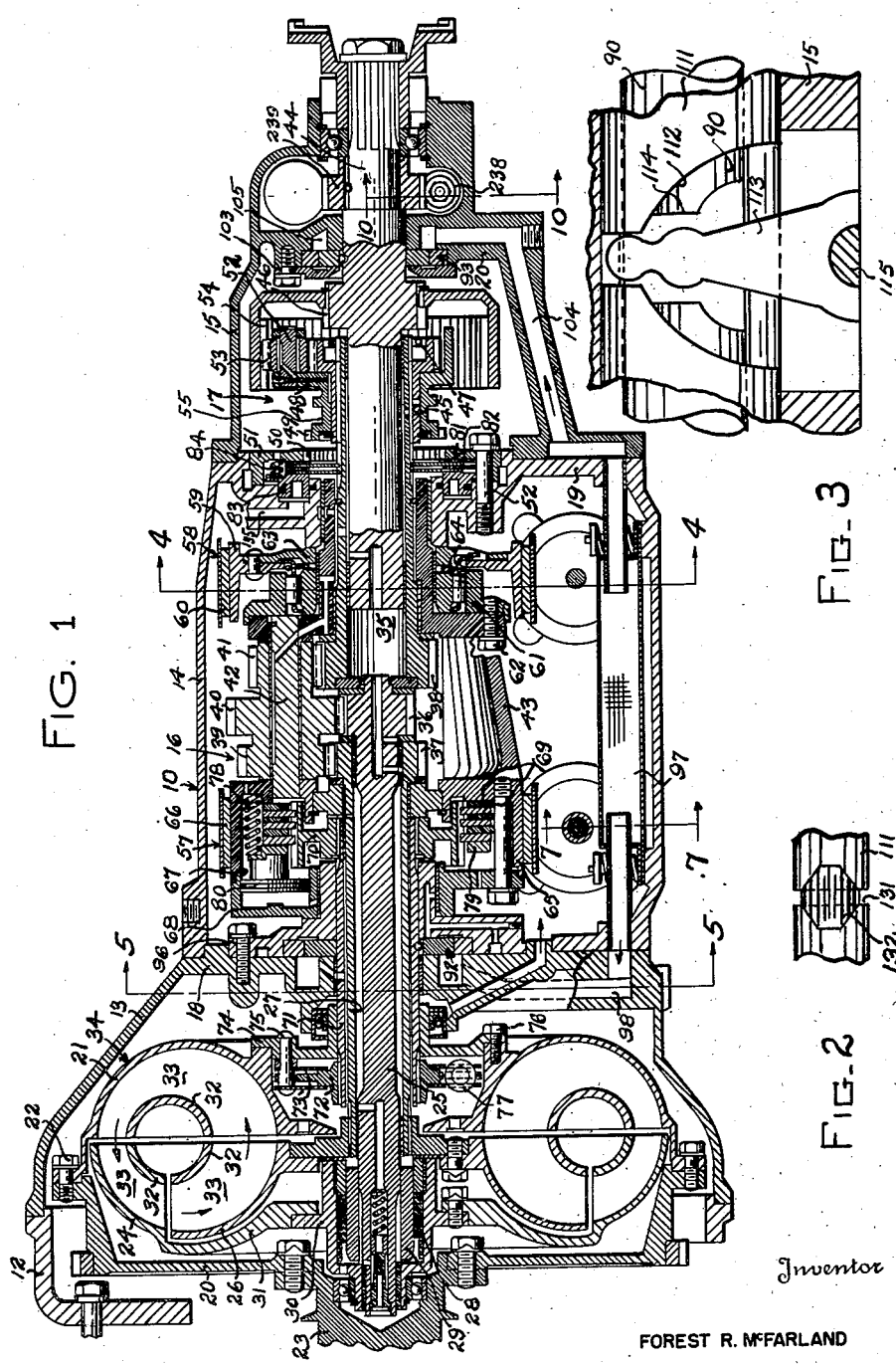
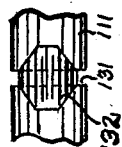
Inventor
FOREST R. McFARLAND
By Tibbetts & Hart
Attorney Feb. 5, 1952     F. R. McFARLAND     2,584,965
TRANSMISSION
Filed April 5, 1946     5 Sheets-Sheet 2
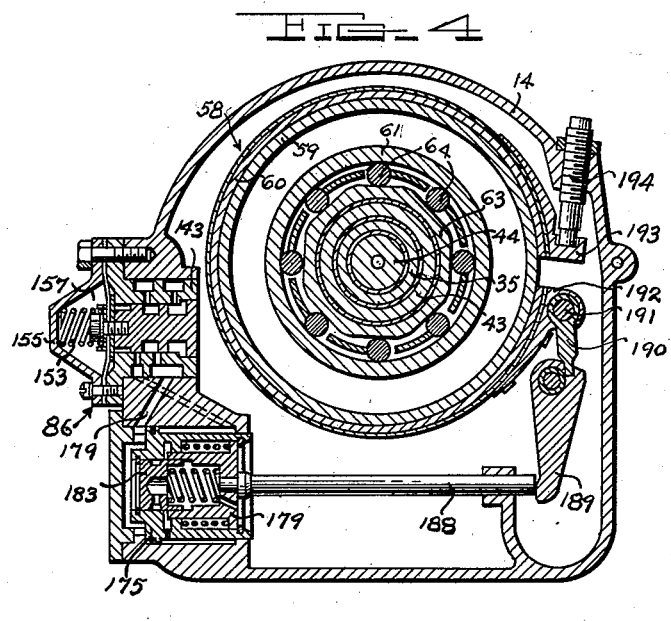
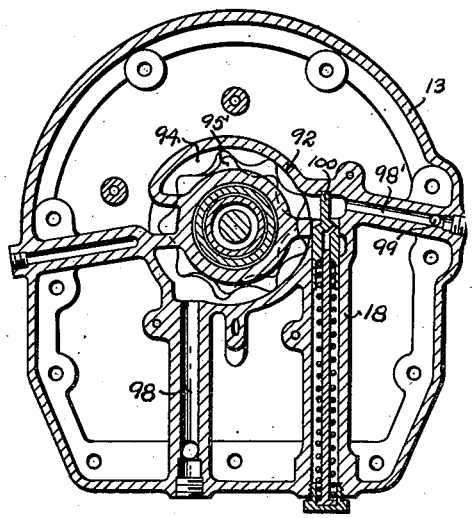
Inventor
FOREST R. McFARLAND
By Tibbetts & Hart
Attorney Feb. 5, 1952   F. R. McFARLAND   2,584,965
TRANSMISSION
Filed April 5, 1946   5 Sheets-Sheet 3
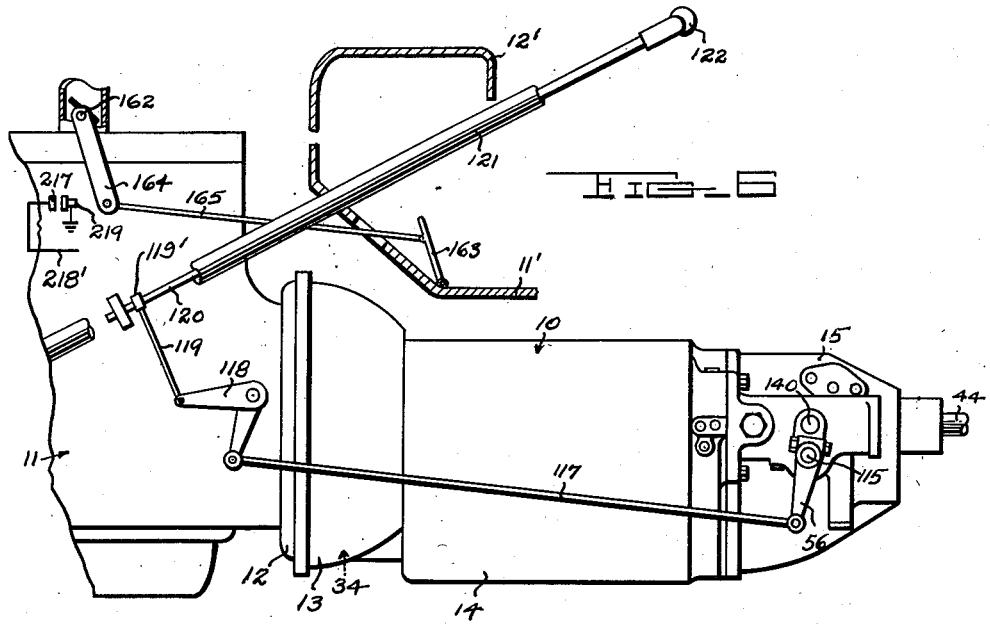
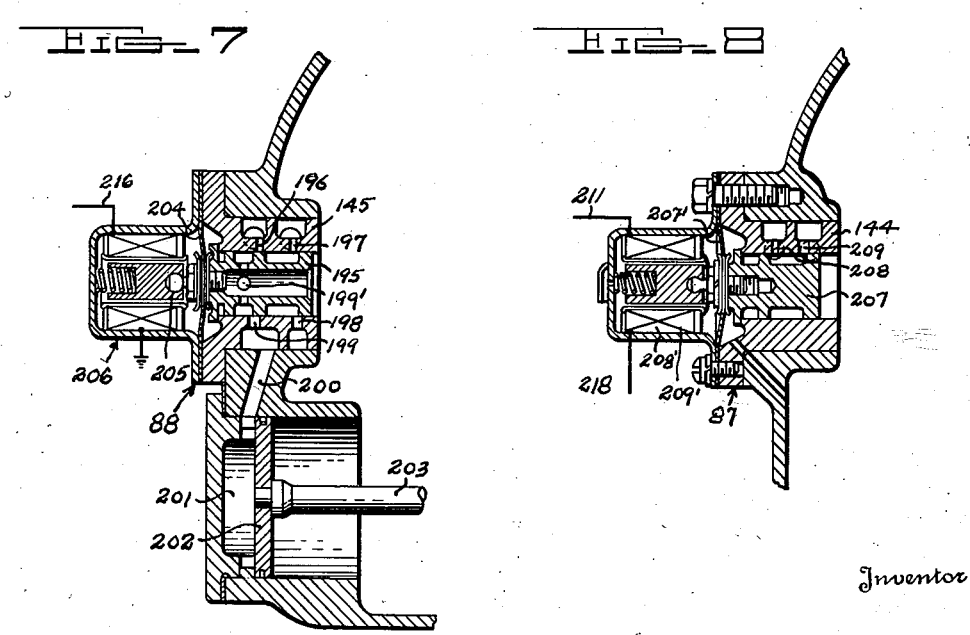
Inventor
FOREST R. McFARLAND
By Tibbetts M Hart
Attorney Feb. 5, 1952 F. R. McFARLAND 2,584,965
TRANSMISSION
Filed April 5, 1946 5 Sheets-Sheet 4
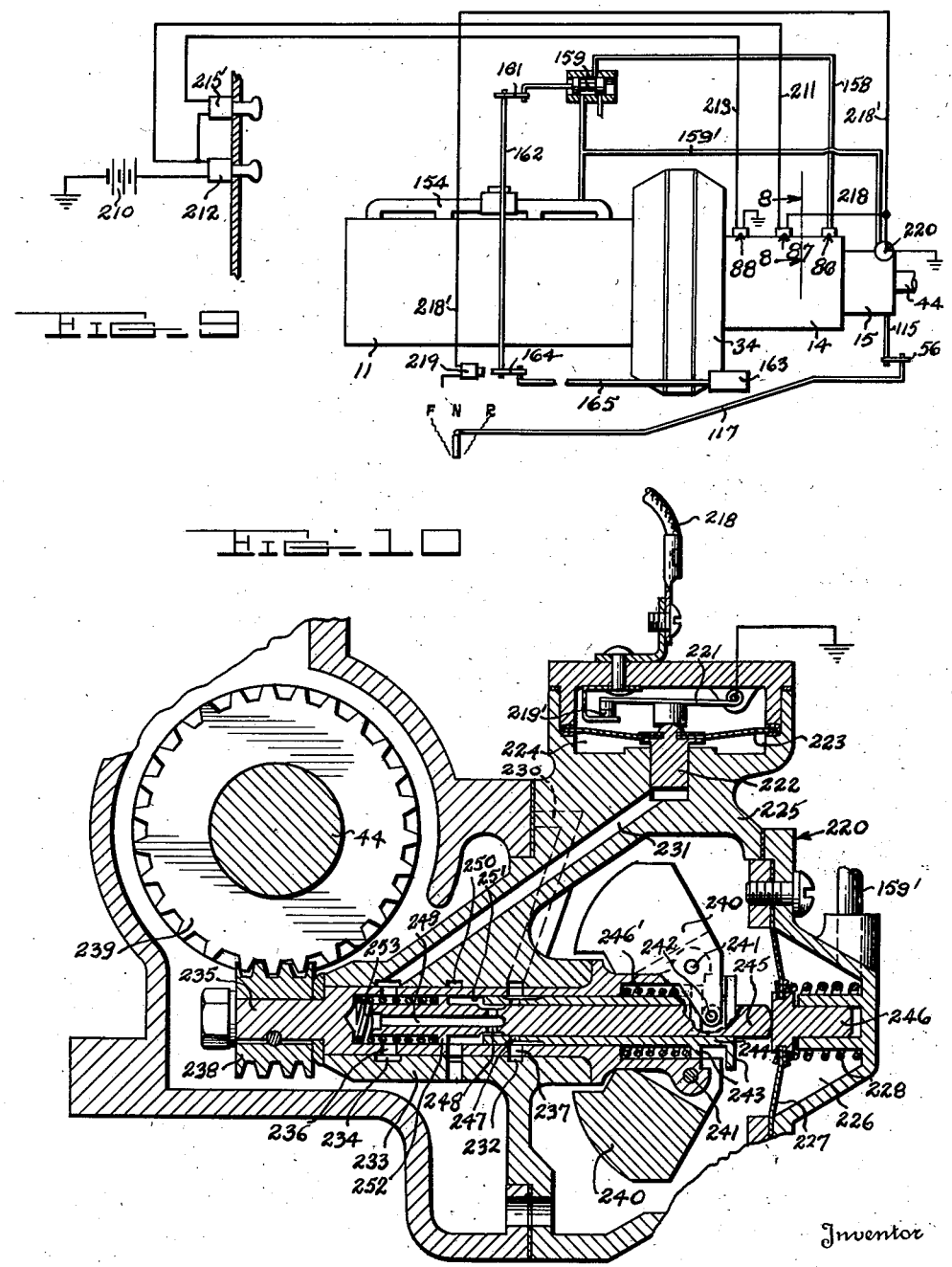
Inventor
FOREST R. McFARLAND
By Tibbetts Hart
Attorney Feb. 5, 1952    F. R. McFARLAND    2,584,965
TRANSMISSION
Filed April 5, 1946    5 Sheets-Sheet 5
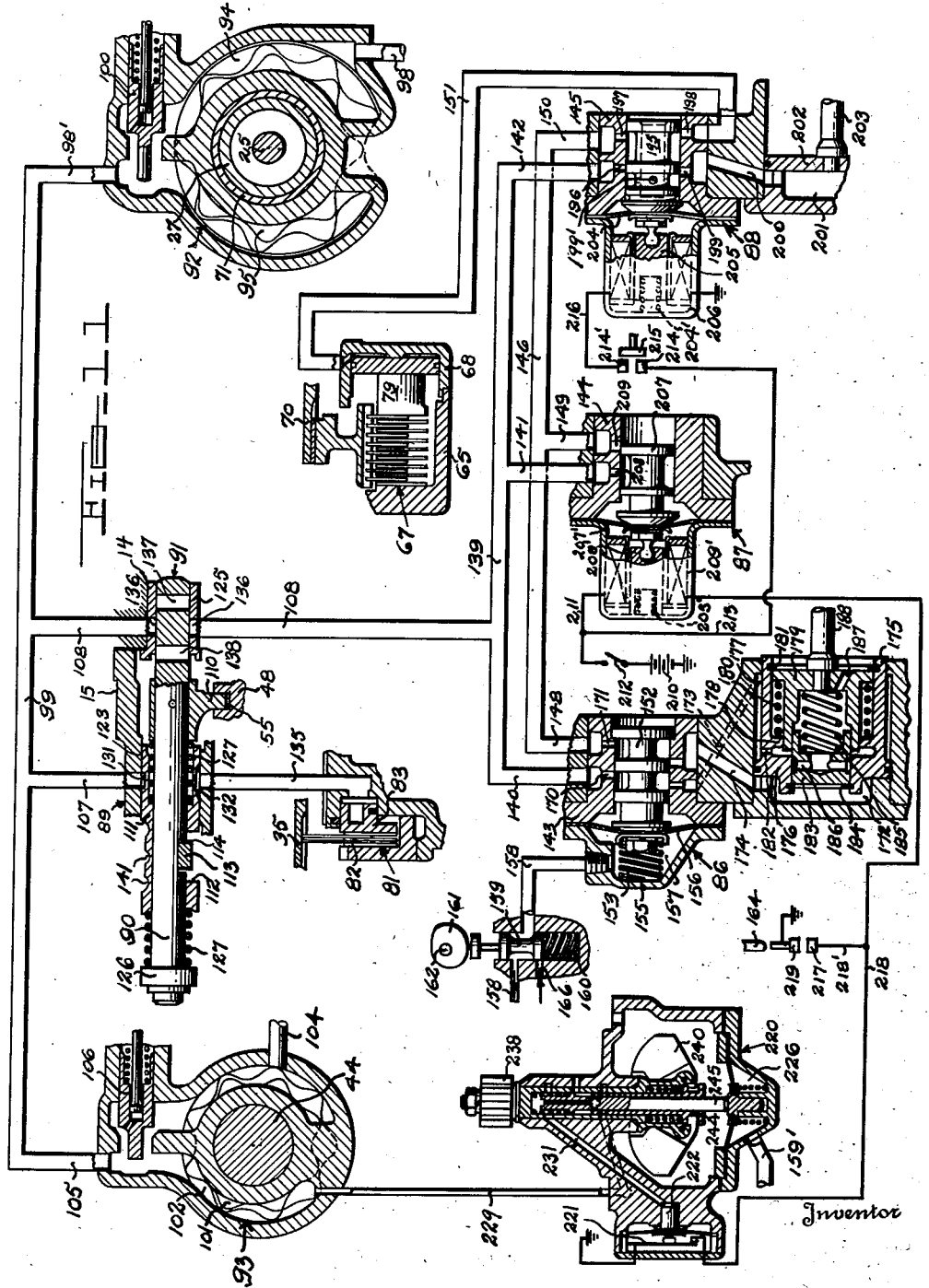
Inventor
FOREST R. McFARLAND
By
Attorney Patented Feb. 5, 1952

2,584,965

UNITED STATES PATENT OFFICE 2,584,965

TRANSMISSION

Forest R. McFarland, Huntington Woods, Mich., assignor to Packard Motor Car Company, Detroit, Mich., a corporation of Michigan Application April 5, 1946, Serial No. 659,774

27 Claims. (Cl. 74—472)

This invention relates to transmissions and more particularly to transmissions for motor vehicles.

One type of transmission includes planetary gearing for drivingly connecting a driven shaft with one or more drive shafts powered by an engine driven fluid coupling of the Fottinger type. Reduced drive through the gearing is generally established by braking the planetary carrier and direct drive is generally established by clutching together two parts of the gearing. There is usually a tail shaft and forward and reverse drive mechanism is employed to drivingly connect the driven shaft and the tail shaft.

An object of the invention is to provide a transmission of the character referred to with a fluid coupling having two runners and gearing effective to provide variable speed ratios.

Another object of the invention is to provide a transmission of the character referred to with a fluid actuated brake device for the driven shaft that will be controlled by the shift mechanism to be effective in neutral and ineffective in forward or reverse drive positions.

Another object of the invention is to provide a transmission of the character referred to with a brake for effecting reduction drive through the gearing, the brake being controlled by engine intake manifold pressure to disengage while the engine is idling.

Another object of the invention is to provide a transmission of the character referred to with automatic means consisting of a fluid system having electrically controlled valves and a driver or operator and speed responsive control means, whereby the shift will be up or down depending upon intake manifold pressure and vehicle speed, modified by two driver operative means to establish reduction drive through the gearing.

Other objects of the invention will appear from the following description taken in connection with the drawings, which form a part of this specification, and in which:

Fig. 1 is a longitudinal sectional view of a transmission embodying the invention;

Fig. 2 is a fragmentary view looking at the bottom of the shifter sleeve valve;

Fig. 3 is a fragmentary view of the shifter mechanism looking from the inside of the transmission toward the outside;

Fig. 4 is a transverse sectional view of one of the control devices taken substantially on line 4—4 of Fig. 1;

Fig. 5 is a transverse sectional view through the transmission taken substantially on line 5—5 of Fig. 1 and showing the forward pump;

Fig. 6 is a side elevation showing the transmission and associated parts;

Fig. 7 is a sectional view of one of the control devices taken on line 7—7 of Fig. 1;

Fig. 8 is a sectional view of another control device taken on line 8—8 of Fig. 9;

Fig. 9 is a diagrammatic plan view of the transmission and associated controls;

Fig. 10 is a sectional view of the speed and vacuum control device taken substantially on line 10—10 of Fig. 1; and Fig. 11 is a view, partly diagrammatic, of the control mechanism.

The transmission indicated generally by numeral 10 is driven by a conventional internal combustion engine 11 and is suitable for driving a motor vehicle, the floor board 11' and instrument panel 12' of which are illustrated in Fig. 6. The transmission is housed in a casing comprised of sections 12, 13, 14 and 15. A fluid flywheel indicated generally by the numeral 34 is housed in a chamber formed by casing sections 12 and 13, the transmission gearing 16 is housed in casing section 14 and forward and reverse selector mechanism 17 is housed in casing section 15. The rear ends of casing sections 13, 14 and 15 are formed respectively with transversely extending walls 18, 19 and 20. Casing section 12 is suitably secured to the rear end of engine 11 and the casing sections are secured together in aligned relation by suitable fastening means.

The fluid coupling 34 is of the general Fottinger type but the major portions thereof are arranged in a novel manner. The impeller consists of sections 20 and 21 secured in axial alignment by bolts 22 and form a housing for containing fluid. Section 20 is secured to the engine crankshaft 23 which provides the drive shaft for rotating the fluid coupling. The coupling also includes two runners, the primary one of which comprises a rotor 24 and a power shaft 25 and the secondary one of which comprises a rotor 26 and power shaft 27. A one-way spring clutch 28 provides a driving connection between a sleeve 29 splined to shaft 25 and a hub 30 fixed to a skirt portion 31 of the primary rotor 24. The impeller and rotors each include a shroud ring section 32 and walls 33 connecting the shrouds with the exterior walls to form passages therebetween through which fluid circulates in a counter clockwise direction as viewed in Fig. 1. The passages in the impeller section 21 open forwardly and the passages in the rotors are arranged so that fluid leaving the impeller first passes into the primary rotor 24, from the primary rotor to the secondary rotor 26 and from the secondary rotor back into the impeller section 21.

Drive from the runners is transmitted to driven shaft 35, which is in axial alignment with runner shafts 25 and 27, by gearing of the planetary type and by means of which two geared reduction drives may be had through two gear trains. Gear 36 is fixed to the rear end of shaft 25, gear 37 is fixed to the rear end of shaft 27 and gear 38 is fixed to the front end of shaft 35. Gears 37, 36 and 38 mesh respectively with planet gears 39, 40 and 41 that are shown formed as a unit but they may be formed separately and secured together as a unitary structure. There may be one or more of these planet gear units and each unit is rotably mounted on a pin 42 fixed to a carrier 43. When rotation of the carrier is unrestricted it will be driven freely in a reverse direction and drive will not be transmitted therethrough to shaft 35. The low speed reduction gear train consists of gears 36, 40, 41 and 38 while the higher speed reduction gear train consists of gears 37, 39, 41 and 38. When the carrier 43 is held stationary drive will be transmitted through one or the other of the gear trains depending upon which of the runners 24, 26 is effective. When the fluid coupling is rotating at low speed the primary runner will be effective to drive power shaft 25 and the low speed gear train associated therewith, and at some increased speed of rotation of the fluid coupling the secondary rotor will become effective so that shaft 27 will become the driver for the gear train associated therewith and shaft 25 will overrun rotor 24. Drive through either of the gear trains will be referred to as geared drive.

Tail shaft 44 is in axial alignment with telescoped shafts 25 and 27 and extends into the sleeve shaft 35. Shafts 35 and 44 are connected for forward or reverse drive by mechanism 17. Sun gear 45 is splined on shaft 35 and is shiftable axially thereon. The tail shaft is provided with splines or teeth 46 with which internal clutch teeth 47 on the sun gear 45 are adapted to be meshed to provide a direct connection between the driven shaft and the tail shaft in order that forward drive of the vehicle may be effected. A clutch sleeve or carrier 48 is sleeved but prevented from endwise movement on sun gear 45 and has external teeth 49 formed thereon adapted to engage with internal teeth 50 formed on an abutment member 51 fastened by bolts 52 to wall 19 of the casing section 14. The carrier 48 supports pins 52 on which reverse idler gears 53 are rotatably mounted. These reverse idler gears mesh with sun gear 45 and with internal teeth on ring gear 54 that is engaged with splines 46 to rotate in unison with tail shaft 44. The clutch shifter sleeve 48 is formed with a recess 55 to receive shift fork 110, see Fig. 11. When the clutch sleeve is shifted to the left, as viewed in Fig. 1, teeth 49 will mesh with teeth 50 to hold the clutch sleeve stationary so the drive from the sun gear 45 through the planet gears 53 to ring gear 54 will rotate tail shaft 44 at a reduced speed and in a reverse direction relative to the rotation of shaft 35. When the clutch sleeve 48 is shifted to the right, as viewed in Fig. 1, sun gear teeth 47 will engage with splines 46 so that shaft 44 will be rotated in the same direction and as a unit with shaft 35.

The reaction devices 57 and 58 in casing section 14 are provided to hold the carrier 43 stationary in order to establish geared reduction drive through the planetary gearing. The device 58 includes a reaction member 59 having a rim portion adapted to be engaged and held stationary by a brake band 60. The ring extension 61 is secured to the rear end of carrier 43 by bolts 62 and another member 63 fixed to abutment member 59 projects within the carrier extension and has cam surfaces in spaced relation therefrom. Brake rollers 64 are arranged between the inner surface of the carrier extension and the cam surfaces of the abutment ring and serve as a one-way brake device for the carrier when the brake band 60 is applied to reaction member 59. With this form of one-way brake arrangement for the carrier, drive will be transmitted from the fluid coupling through the gearing to the driven shaft 35 when the brake is applied and the coupling is the driving member, but when the tail shaft 44 is the driver then of course there will be no driving connection forwardly through the gearing from the shaft 35 to the runners.

When the reaction device 57 is effective positive geared drive between the fluid coupling and the driven shaft 35 will be definitely established regardless of whether the fluid coupling or the driven shaft is the driver. The carrier 43 is formed with a forwardly extending shell 65 forming a reaction member against which brake band 66 is applied to hold the carrier stationary.

High speed drive through the planetary gearing is obtained by the application of a friction clutch device 67 that is housed by the extension 65 of the carrier 43 and by closure member 68. This clutch device when applied provides part of a connection whereby carirer 43 will be driven from the fluid coupling impeller at the same speed as the power shaft 23. The clutch device includes clutch plates 69 slidably splined alternately to carrier extension 65 and clutch hub 70 which latter is splined to sleeve shaft 71 rotatably mounted around the runner sleeve shaft 27 and extending forwardly through wall 18 into the chamber housing the fluid coupling. The forward end of this shaft 71 has a ring member 72 splined thereon and partially telescoped by ring plates 73 fixed to a hub 74 by rivets 75. This hub member 74 is secured to the shell of the impeller section 21 by bolts 76. The rivets 75 extend through segmental slots in ring member 72 so that there may be some rotative movement between the ring member 72 and the hub member 74. Coil springs 77 are disposed in registered recessed portions of the ring plates 73 and the ring member 72 to provide a limited flexible driving connection therebetween so that shock resulting from engagement of the clutch plates will be absorbed. The clutch plates 69 are normally disengaged by coil spring 78 urging pressure plate 79, as viewed in Fig. 1, to the left, and the clutch plates are engaged through means of pistons 80 slidable in chambers in the closure member 68.

When the clutch device 67 is engaged a driving connection between impeller section 21 and carrier 43 is established thereby imparting rotation to gear 41 bodily about the axis of the carrier which tends to rotate gear 38 on driving shaft 35 therewith. At the same time the fluid coupling speed is such that the primary runner 24 will be the driver and will impart rotation through the lower speed gear train drive by shaft 25. While there is some reaction to the primary runner drive, it is overcome by fluid pressure in the coupling so the drive from the coupling to the driven shaft 35 will flow through two paths, and the joint torque thereof is transmitted to the driven shaft. The speed at which the driven shaft is rotated is substantially that at which the power shaft is rotating except for slight loss due to fluid slip in the coupling.

In Fig. 1 the forward and reverse selector mechanism is shown in neutral position and in this relation there can be no drive transmitted from shaft 35 to shaft 44. In order to aid the engagement of the forward and reverse mechanism 17 when shifting into forward or reverse drive relation I provide synchronizing mechanism in the form of a brake device 81. This device comprises brake plates 82 engageable with member 51 by means of a pressure operated piston 83 against which springs 84 act to normally allow the plates to disengage. The brake plates, springs and piston are arranged in a chamber formed by abutment member 51 and wall 19. The plates 82 are slidably splined on the driven shaft 35 and are clamped against stationary abutment member 51. The arrangement is such that the plates when engaged will hold the driven shaft 35 stationary while the forward and reverse mechanism 17 is in neutral position and the engine is running so that there will be no rotation of teeth 43 or teeth 47 while being shifted into engagement with teeth 50 and 46 respectively to effect forward or reverse drives.

The reaction brake devices 57 and 58, the synchronizer brake device 81 and the clutch device 67 are controlled by a fluid system in which is arranged a plurality of valve control devices, see Fig. 11. Valve device 86 controls fluid flow to one-way reaction brake device 58, valve device 87 controls fluid flow to the clutch device 67 and valve device 88 is effective to control shift down from the clutch device 67 to the two-way brake device 57. Valve device 89 controls fluid flow to the synchronized brake device 81, and one end of the shift rail 90 for shifting clutch sleeve 48 forms a primary valve device 91 controlling flow to the valve devices 86, 87 and 88.

There are two pumps 92 and 93 in the fluid control system by means of which fluid under pressure is circulated from the bottom of casing section 14 to the various control devices under pressure sufficient to operate them. Front pump 92 consists of gears 94 and 95 housed in a chamber between wall 18 and wall 96, gear 95 being rotated by shaft 71 that is rotated directly by the impeller of the fluid coupling. This particular form of gear pump is conventional. Fluid is moved to the pump 92 from the bottom of casing 14 through a screen 97 and passage 98 and is moved from the pump through a passage 98' to main delivery passage 99, a suitable pressure relief valve 100 being associated with the outlet side of the pump to limit the pressure in the delivery passage 99.

Rear pump 93 is similar in construction to pump 92 and comprises gear 101 fixed to tail shaft 44 and gear 102 housed in a chamber formed by wall 20 and cover plate 103. Inlet passage 104 leads from screen 97 to pump 93 and outlet passage 105 leads from pump 92 to the main feed passage 99 through the casing sections 15 and 14. Pressure relief valve 106 is provided in the outlet passage 105.

The main fluid feed passage 99 has two outlet branches 107 and 108, branch 107 leading to the synchronizer brake 81 and branch 108 leading to the other fluid control devices. Fluid flow to the synchronizer brake is under control of the forward and reverse gearing shifter mechanism in which shift rail 90 has a fork 110 fixed thereto that engages in the recess 55 of sleeve 48. This shift rail is mounted in a valve and actuator sleeve 111 having a slot 112 into which arm 113 engages, such arm also extending through a slot 114 in the shift rail. Arm 113 is fixed to shaft 115 extending outside of casing 15 and arm 56 fixed on shaft 115 is connected by link 117 with bell crank 118 that is rocked by rod 119 actuated by an arm 119' on rod 120 arranged adjacent the steering wheel column 121 and having a handle 122 for operation by the driver.

Valve sleeve 111 is axially movable in bore 123, shift rail 90 is axially movable relative to valve sleeve 111, and the valve end 91 is axially movable in sleeve 125 fixed to casing 14. Collar 126 is fixed to rail 90 and coil springs 127 surround the rail between the sleeve valve 111 and the fork 110 and between the sleeve valve 111 and the collar 126. These springs balance to normally maintain the valve sleeve in a central position between the fork 110 and collar 126. The valve sleeve has a peripheral groove 131 a narrow section of which is adapted to be registered with branch passage 107 and a wider section 132 of which registers with passage 135 leading to the synchronizer brake chamber.

When shifter arm 113 is in neutral position, valve sleeve 111 will be in its central position to register groove section 131 with passage 107, thereby allowing fluid flow to engage the synchronizer brake. Upon rocking arm 113 fore or aft by operation of lever 122, the valve sleeve 111 will be shifted ahead of rail 90, this being possible because slot 114 is wider than slot 112, see Fig. 3. Such shifting of the valve sleeve will shift groove 131 out of registration with passage 107 to shut off fluid flow to the synchronizer brake and groove section 132 will vent passage 135 as the shifter mechanism is clutched for forward or reverse drive. Shifting of the valve sleeve 111 ahead of the rail 90 will cause one of the springs 127 to exert a force against the fork 110 or collar 126, depending upon the direction of shift, sufficient to engage the clutch sleeve for forward or reverse drive. In the event the clutch teeth abut when the shift is made, the spring will be compressed and will complete the shift upon slight rotation of one of the clutch members. Detent 140 (shown diagrammatically in Fig. 6) is arranged to engage recesses 141 in the rail under light spring pressure to retain the shift mechanism in forward, reverse or neutral.

The shift rail 90 in addition to selecting forward and reverse drive and controlling fluid flow to the synchronizer brake device also provides a primary valve for controlling flow in the fluid system through feed passage 108 connecting passage 99 with control valve devices 86, 87 and 88. Sleeve 125 receiving the rail valve end 91 has aligned ports 136 that are shut when the rail is in neutral position. The rail has pasages 137 and 138 therethrough adapted to register with ports 136 when the rail is in forward or reverse position. Thus the fluid system to valve devices 86, 87 and 88 is shut off by the shift rail in neutral position and is open through the shift rail when in forward or reverse positions.

Passage 108 extends across the casing section 14 through wall 19 where it connects with passage 139, see Fig. 11, having outlet branches 140, 141 and 142. Branch passage 140 leads to valve sleeve 143 of control device 86, branch passage 141 leads to valve sleeve 144 of control device 87 and branch passage 142 leads to valve sleeve 145 of control device 88. Passage 146 parallels passage 139 and has branch passage 148 leading to sleeve 143, branch passage 149 leading to sleeve 144 and branch passage 150 leading to valve sleeve 145. Passage 151 leads from valve sleeve 145 to the clutch chamber in carrier extension 68 so that pressure fluid may act against actuator 80 to engage the clutch device 67.

Valve device 86 is arranged to control brake device 58 and the position of valve 152 in sleeve 143 is under control of spring 153 and pressure in the engine fuel intake manifold 154. Cap 155 clamps diaphragm 156 to sleeve 143 and forms a chamber 157 that is connected with the intake manifold by conduit 158. The diaphragm is secured to the valve 152, and the spring 153 in chamber 157 creates a force against the diaphragm urging the valve toward the right in Fig. 11 to open position. The spring force is opposed by subatmospheric manifold pressure and the arrangement is such that subatmospheric manifold pressure is sufficient to overcome the spring and close valve 152 when permitted to function with the engine idling. Valve 159 is interposed in conduit 158 and is normally held open by spring 160 and is closed by cam 161 rotatable with throttle valve operating rod 162 that is given rotative movement from the accelerator pedal 163 by lever 164 and link 165. When the accelerator pedal is in engine idling position, the cam will permit spring 160 to open valve 159 whereby subatmospheric pressure in the intake manifold will shift diaphragm 156 to close valve 152. Upon depressing the accelerator pedal to accelerate the engine, cam 161 will shift valve 159 to close the connection with the manifold and to open chamber 157 to atmosphere through vent 166. Thus the brake control device 86 will be ineffective to hold the planetary gearing carrier, when the engine is idling and the vehicle is standing still, until the accelerator pedal is depressed from engine idling position. In order to establish drive by device 57, the shift rail 90 must be first moved to forward or reverse position and the accelerator must be depressed, such operations being in series.

The valve control device for brake 60 includes means whereby brake application occurs in two stages having different rates of speed. Valve housing sleeve 143 has a port 170 open to the valve chamber and to branch passage 140 and has another port 171 open to the chamber and branch passage 148. Actuator chamber 172 is connected with the valve chamber by passage 174, and chamber 177 is connected with the valve chamber by a passage 173. Piston valve 152 has a plurality of flanges or lands whereby port 170 may be connected with either of the passages 173 or 174 depending upon its position and, as shown in Fig. 11, the engine is running idle and the vehicle is standing still so that valve 159 is open whereby valve 152 has been moved to its left position opening passage 140 to passage 173 and closing passage 140 to passage 174.

A compound piston and valve device is arranged in chamber 172 and forms part of the actuator means for the brake in device 58. Sleeve piston 175 is axially movable in the chamber 172 and has a flange 176 at one end sealing off passage 174 from the chamber 177 with which passage 173 openly communicates. Sleeve piston 175 also has an internal flange 178 and within the sleeve piston a nested piston member 179 is axially slidable. Between the planed head end of said piston member 179 and the flange 178 is arranged a coil spring 180. A stop ring 181 in piston 175 limits axial movement of piston member 179 in one direction and spring 180 normally seats member 179 against the stop ring 181 whereby the other end of member 179 is spaced from flange 176 and such space opens to port 182 in member 175. A valve 183 is located internally of the telescoped piston members and is normally held against stop ring 184 in member 175 by spring 185 arranged within member 179. The valve 183 has limited axial movement and a radial port 186 adapted to vent fluid from chamber 177 when moved to communicate with port 182. Member 179 has a vent port 187 in its end and through which fluid passing through valve port 186 may flow back into casing 14. Piston member 179 is fixed to one end of rod 188 and the other end of the rod engages cam lever 189, see Fig. 4, arranged to actuate arm 190 mounted on pin 191 in bracket 192 fixed to brake band 60. The other end of such brake band has a bracket 193 abutting an anchor member 194 fixed to casing 14.

The valve control device 88 in the fluid system for the two-way brake reaction device 57 includes the housing sleeve 145 in which flanged hollow valve 195, open at one end, is axially movable. Port 196 connects conduit 142 with the interior of the valve sleeve and port 197 connects conduit 150 with the interior of the valve sleeve. The fluid feed conduit 151 to the clutch device 67 is connected with the interior of the valve sleeve by port 198 and sleeve port 199 is open to passage 200 leading to the interior of casing 201 in which actuator piston 202 is axially movable. This piston is fixed to rod 203 for operating mechanism (not shown) for applying and releasing brake 66, the operating mechanism being the same as that between rod 188 and brake band 60. Valve 195 is attached to diaphragm 204 to which armature 205 of grounded solenoid 206 is fixed and is normally opened to the clutch device by spring 204'. When valve 195 is in the position shown in Fig. 11, vent 199' therein is open to port 199 relieving chamber 201 of fluid.

Valve device 87 comprises a valve sleeve 144 and a flanged valve 207 that is axially shiftable in the sleeve. This valve device serves to establish or shut off fluid flow between conduits 146 and 139. Port 208 in the valve sleeve communicates with conduit 141 and port 209 in the valve sleeve communicates with conduit 149. The valve is fixed to a diaphragm 207' and to armature 208' of solenoid 209' and is normally opened by spring 205'.

The valve devices 87 and 88 are controlled by electrically energized means including the solenoids 206 and 209'. Battery 210 is connected with line 211 leading to solenoid 209' and a switch 212 is interposed in such line, the switch may also be for the engine ignition system (not shown). Line 213 connects line 211 with contact 214 at the instrument board and contact 214' is connected by line 216 with solenoid 206. Switch 215 is operable by the driver to engage and disengage contacts 214 and 214' to control the electric circuit to solenoid 206.

Solenoid 209' is connected with contact 217 by lines 218 and 218', and a grounded switch 219 fixed to accelerator pedal 163 is operable to engage or disengage the contact 217 to make or break the electric circuit for solenoid 209'.

Solenoid 209' is also controlled by a device 220 in which an electric circuit is controlled by means responsive to vehicle speed and fuel intake manifold pressure. Line 218 leads to contact 219' (see Fig. 10) of a switch having a grounded contact arm 221 movable by an actuator plunger 222 fixed to diaphragm 223 traversing chamber 224 in switch housing 25. This housing also contains a chamber 226 closed by diaphragm 227 and containing spring 228. Conduit 159' is in open communication with chamber 226 and subatmospheric pressure acts upon diaphragm 227 to move it to the right, as viewed in Fig. 10, and spring 228 acts to move the diaphragm to the left.

Housing 225 also contains a vehicle speed responsive valve device for a fluid pressure system connecting pump 93 with the actuator plunger 222 for switch arm 221. Passage 229 leads from pump 93 to passage 230 and passage 231 leads to the plunger actuator 222. Passage 230 connects with a circular groove 232 in the bored standard 233 and passage 231 connects with circular groove 234 in the bored standard. Sleeve shaft 235 is rotatably mounted in the bored standard and has ports 236 registering with ports 234 and ports 237 registering with groove 232. This sleeve shaft has gear 238 fixed thereto and meshing with gear 239 driven by tail shaft 44. Flyweights 240 are pivoted on pins 241 fixed to the sleeve shaft and have arms carrying pins 242 extending between flanges 243 on valve member 244 that is axially movable in and carried by the sleeve shaft. Another valve member 245 projects into valve member 244 and bears against plunger 246 fixed to diaphragm 227. Member 244 of the compound valve is shifted by the governor flyweights opposed by spring 246'. Member 244 has radial fluid inlet ports 247 adapted to register with groove 232 and ports 237 and member 245 has radial ports 248 adapted to register with ports 247 of the other valve member, ports 248 being open to an axial passage 249 extending through the inner end of member 245. A circular vent groove 250 extends around the bore wall of standard 233 and registers with the space 251 between the inner end of valve member 244 and flange 252 on valve member 245 that slidably engages the inner wall of sleeve shaft 235. Spring 253 exerts pressure against flange 252 to hold valve member 245 against plunger 246.

When the vehicle is standing still the rear pump 93 will not be operating and the front pump 92 is operative only while the engine is running. Thus, whenever the ignition switch 212 is closed and the engine is running, the pressure fluid system will be conditioned for operating the various control devices with which it is connected. With the engine idling and the forward and reverse mechanism in neutral the shift rail 90 will shut off fluid flow from conduit 99 to conduit 139. Also when the shift mechanism is in neutral sleeve valve 111 will be in its neutral position, due to the similar force exerted against opposite ends thereof by springs 127, to register grooves sections 131 and 132 with conduits 107 and 135 whereby pressure fluid will flow to the synchronizer brake device 81 and will act against the actuator piston 83 to engage the brake plates 82 and thereby frictionally hold the shaft 35 stationary. With the shaft 35 held stationary the driver next conditions the mechanism for forward or reverse drive by moving the shift lever forwardly or rearwardly to register one of the ports 137 or 138 with passage 108 to thereby connect conduit 99 with conduit 139. Valve device 66 is normally held in open position by spring 153 to connect port 170 and passage 140 with passage 174 but with the engine idling conduit 158 will be opened so that intake manifold sub-atmospheric pressure will overcome spring 153 and will move valve 152 to the position shown in Fig. 11 whereby there can be no flow of fluid from conduit 140 through passage 174 and consequently brake device 58 will be released from the reaction member 59 so that the carrier is free to rotate in a reverse direction carrying the planetary gears therewith. With the synchronizer brake device 81 applied, shaft 35 is held stationary so that when the sleeve 48 is shifted to engage teeth 49 with teeth 50 or teeth 47 with splines 46 there will be no relative rotation of such teeth to be mated and consequently the shift can be made without clashing of the clutch teeth. The transmission is now conditioned to drive as soon as brake device 58 is engaged and it is only necessary for the driver to depress the accelerator pedal beyond throttle idling position in order to establish the low speed geared drive. As the accelerator pedal is depressed cam 161 will move valve 159 to cut off the sub-atmospheric pressure line 158 from chamber 157 and spring 153 will move valve 152 to permit flow from conduit 140 to passage 174. Prior to this shifting of the valve 152 conduit 140 has been opened to passage 173 so, upon the spring shifting the valve, pressure fluid is trapped in passage 173, chamber 177, port 182 and the space between the piston flange 176 and the end of the push rod piston 179 adjacent thereto. This trapped pressure fluid opposes movement of the piston 175 and retards the engagement of the brake device 58 so that a progressively increasing effect and a soft engagement of the brake are obtained.

As the pressure behind the piston 175 increases the valve 183 is moved against the pressure of spring 185 to register port 186 with port 182 so that fluid can vent from port 187. Pressure fluid flowing into chamber 172 from passage 174 will first move valve 183 toward the right, as viewed in Fig. 11, to thereby push spring 185 against the piston 179 which will initiate movement of rod 188 to engage the brake band 60. A similar movement of valve 175 is opposed by spring 180 and by the trapped pressure fluid. Since valve ports 186 register with port 182 some of the trapped pressure fluid can escape through vent 187 so that the piston 175 can be moved to the right by pressure in chamber 172. Pistons 179, 183 and 175 now move to the right until brake 58 is applied lightly. The reaction of brake 58 is transmitted back to rod 188 and pistons 179 and 183 through lever 189 and arm 190. Piston 175 continues to move until port 182 is blocked off by closure of the space between pistons 175 and 179.

Up to now only spring loads 180 and 185 and pressure on piston 183 have been applied to brake 58 which will insure against a harsh application. A harsh application is further prevented by oil pressure in chamber 172 since rapid venting of chamber 177 is prevented after take up of brake 58, the vent space having been closed. Slow leakage of vent chamber 177 in clearance between piston 175 and housing 14 or piston 179 causes soft engagement of brake 58. Since the brake holds abutment member 59 stationary, the one-way brake 64 will become effective to prevent reverse rotation of carrier 43 whereupon drive will be established from either one of the runner power shafts 25 or 27, depending upon which one is effective. Thus low speed or intermediate speed, referred to as geared drive, will be established so long as the engine shaft is the driver, and when the tail shaft becomes the driver the one-way brake 64 is ineffective and the drive will be broken until the engine shaft again takes over the drive. When the ignition switch 212 is closed switch contact 221 will be closed to establish a circuit energizing solenoid 209' which will hold selector valve 207 in the position shown in Fig. 11 whereby communication between the main feed conduit 141 and the outlet passage 149 is cut off and hence there can be no fluid flow through conduit 146 or passage 150. The dash switch 215 will be open so that there will be no circuit to solenoid 206 and valve 195 will be moved to the position shown in Fig. 11 shutting off port 196 and opening port 197 to port 198 but this is immaterial because there will be no fluid flow in conduit 146 because of valve 207 shutting off fluid flow thereto from conduit 141. Thus the clutch device 67 will have no pressure fluid flowing thereto and it will be disengaged. Fluid flow from conduit 142 to piston chamber 201 is cut off by valve 195 and chamber 201 is open to vent 199' so that brake device 57 will not be applied. In the meantime as soon as shift rail 90 is moved to establish flow through either one of the ports 137 or 138 and the sleeve 48 has been moved into forward or reverse drive relation, sleeve valve 111 will first be shifted by end of arm 113 to move port 131 out of registration with passage 107 whereby fluid flow to engage the brake is shut off and the wider groove section 132 is moved to vent passage 135 leading to the synchronizer brake. As arm 113 is moved it will compress one of the springs 127 thus shifting rail 90 and moving yoke 110 therewith for engaging the teeth 47 or 49 into mesh establishing forward or reverse drive position depending upon the direction of shift. In the event the teeth 47 or 49 abut, when being shifted into engagement, one or the other of the spring 127 will be compressed and will cock the sleeve valve 111 to move the teeth into engagement with the mating teeth as soon as there is a slight rotation of the clutch sleeve or the tail shaft. With the control devices in the position just described the transmission will remain in geared drive until a vehicle speed and intake manifold pressure cause a shift to high speed drive. Spring 246' of the speed responsive device will prevent this up shift until the vehicle speed is above 12 miles per hour or thereabouts, such speed being referred to as the governed speed.

Up shift to high speed gear ratio in the planetary gearing takes place when the circuit to solenoid 209' is broken. This can be accomplished by disengaging arm 221 from contact 219' by means of fluid pressure flowing through conduit 229 to passage 230 and into passage 231, when the compound valve permits such flow, whereby actuator 222 is shifted to open the switch arm 221. The compound valve device is arranged so that as the weights 240 move out in response to increased vehicle speed they will move sleeve 244 to the left, as viewed in Fig. 10, and subatmospheric intake manifold pressure acting upon diaphragm 227 will move the valve member 245 axially in opposition to spring 228 acting against the diaphragm. The arrangement is such that this compound valve will be closed below the governed speed and it may be opened at any speed above the governed speed depending upon pressure in chamber 226. Thus the valve member 245 selects the speed at which ports 248 and passage 249 will be open to ports 247 whereby fluid may flow from passage 230 to passage 231 through ports 236 in the driving shaft for the flyweights. As soon as pressure fluid passes through passage 249 it will act against flange 252 to return the valve member 245 and the guide plunger 246 to the extreme right hand position beyond that shown in Fig. 10, whereby sleeve valve 244 will have to move to a position below the governed speed before the pressure fluid will again be cut off. While switch 221 is held open to break the circuit to solenoid 209' valve 207 is moved to the right, as viewed in Fig. 11, to establish flow between ports 208 and 209. Solenoid 206 is deenergized so valve 195 is in the position shown in Fig. 11 and pressure fluid will flow from passage 141 to passage 149 through passages 146 and 150 and through the ports 197 and 198 in the valve sleeve 145 to passage 151 leading to the clutch device 67 to apply the same whereupon the drive will be direct from the fluid coupling member through shaft 71 and the clutch device to the carrier 43. At the same time rotor 24 and shaft 25 will be driving and these two paths of power flow will be transmitted through the planetary gearing to shaft 35 so that the tail shaft 44 will be driven at substantially the same speed as the engine drive shaft 23 except for fluid slip in the coupling. Brake device 58 can remain applied as the carrier can overrun abutment member 59. As conduit 146 is now open fluid will flow through conduit 148 and passage 171 to the interior of sleeve 143 where it will act against the large diameter flange at the end of valve 152 to hold the valve in its right hand position even though subatmospheric pressure is in conduit 158 so when the accelerator pedal is released to idling position, it cannot shift valve 152 to its left hand position as shown in Fig. 11. Thus pressure fluid in the clutch feed passage is utilized to hold valve 152 in relation applying brake device 58 when the accelerator is in idling position. Thus the transmission is always conditioned to immediately go back into geared drive automatically when the clutch device 67 becomes ineffective. When the clutch device 67 is engaged valve 195 will be in the position shown in Fig. 11 cutting off fluid flow through port 196 but chamber 201 will be vented by passage 200, port 199 and port 199'. Switch 221 will remain open until the vehicle speed is less than the governed speed whereupon fluid pressure against the switch actuator 222 is relieved and the switch can again close and valve 207 is moved by solenoid 209' to the position shown in Fig. 11 cutting off flow to the clutch device and the brake device 58 which has been held stationary takes over the drive through the one-way brake member 64.

Provision is made for overruling the effect of the speed and vacuum device controlling switch and the driver may utilize overtravel of the accelerator pedal to complete a circuit to solenoid 209' by engaging switch 219 with contact 217. Even though the transmission is conditioned for high speed drive this establishment of a circuit to the solenoid 209' will shift the selector valve 207 to the geared drive position as shown in Fig. 11 cutting off fluid flow from conduit 141 to conduit 149 and therefore to the clutch device 67. The transmission will now function just as it would in geared drive so long as the accelerator pedal remains in overtravel position closing the circuit to solenoid 209' through switch 219. As soon as the accelerator pedal permits switch 219 to again open, which it will do when the accelerator pedal is raised to less than wide open throttle position, and when the vehicle is traveling about the governed speed, solenoid 209' will be deenergized and valve 207 will move to high speed position so that the clutch device 67 will again take over the drive.

Another means is provided for establishing geared drive regardless of vehicle speed. Solenoid 206 is normall deenergized but the circuit therefor may be established by closing the dash switch 215 at the will of the driver. Energizing of solenoid 206 will move valve 195 to the left as viewed in Fig. 11 which will close fluid port 197 in the valve sleeve and will open port 198 so that fluid in conduit 151 will be vented through the end of the valve sleeve. At the same time the valve 195 has moved to the left so that conduit 142 and port 196 are open to port 199, passage 200 and chamber 201 in which piston 202 for actuating brake rod 203 is located. Fluid can now flow to move the actuating mechanism for the two-way brake device 57 to engage the same upon the planetary carrier extension 65 so that geared drive is established through the planetary gearing and the clutch device is vented through port 198 so that high speed drive cannot be established. As long as switch 215 is closed the transmission will remain in geared drive. While the two-way brake device is effective, the one-way brake device 58 is also effective below the governed speed so in the event the solenoid 206 is deenergized and the vehicle is operated below the governed speed the brake device 58 will be applied and the transmission will remain in geared drive. If the vehicle is running above the governed speed when switch 215 is open, then valve 195 will permit fluid flow to the clutch device 67 and high speed drive will be established.

It will be understood that various forms of the invention other than those described above may be used without departing from the spirit or scope of the invention.

What I claim is:

1. In a transmission for motor vehicles driven by an engine having a fuel intake manifold, a power shaft, a driven shaft, planetary gearing including a carrier adapted to connect said shafts in drive relation, a brake device for the carrier, a clutch device for connecting the carrier to the power shaft, a pressure fluid system adapted to operate said devices, valve means for controlling fluid flow in the system to selectively engage said brake device or said clutch device, an electrically energized means for controlling said selector valve means, passage means connecting the pressure fluid system with the electrically energized means in relation to control the pressure fluid system, a valve device in the passage means, means responsive to vehicle speed for actuating said valve device, and means responsive to pressure in the intake manifold for actuating said valve device, said valve device being opened in a variable vehicle speed range above a predetermined speed selected by varying intake manifold pressure.

2. In a transmission for motor vehicles driven by a engine having a fuel intake manifold, a power shaft, a driven shaft, planetary gearing including a carrier adapted to connect said shafts in drive relation, a brake device for the carrier, a clutch device for connecting the carrier to the power shaft, a pressure fluid system adapted to operate said devices, valve means for controlling fluid flow in the system to selectively engage said brake device or said clutch device, an electrically energized means for controlling said selector valve including a switch, passage means connecting the pressure fluid system with the switch in relation to control the pressure fluid system, a valve device in the passage means, means responsive to vehicle speed for controlling said valve device, and means responsive to pressure in the intake manifold for controlling said valve device, said valve device being opened in a variable speed range above a predetermined speed depending upon varying intake manifold pressure.

3. In a transmission for motor vehicles driven by an engine having a fuel intake manifold, a power shaft, a driven shaft, planetary gearing including a carrier adapted to connect said shafts in drive relation, a brake device for the carrier, a clutch device for connecting the carrier to the power shaft, a pressure fluid system adapted to operate said devices, valve means for controlling fluid flow in the system to selectively engage said brake device or said clutch device, an electrically energized means for controlling said selector valve including a switch, passage means connecting the pressure fluid system with the switch in relation to control the pressure fluid system, a compound valve device in the passage means, means responsive to vehicle speed for controlling one part of said valve device, and means responsive to pressure in the intake manifold for controlling another part of said valve device, said valve device being opened in a variable speed range above a predetermined speed depending upon varying intake manifold pressure.

4. In a transmission for motor vehicles, a power shaft, a driven shaft, a tail shaft, a multiple ratio gearing adapted to drivingly connect said power shaft and said driven shaft, devices operative to select different ratio drives through the gearing, shiftable selector mechanism including positive coupling means engageable to effect forward or reverse drive from the driven shaft to the tail shaft, a brake device for holding the driven shaft stationary, a shift member operable by the driver for conditioning said mechanism for forward or reverse drive, a pressure fluid system connected to apply said devices, and valve means in the system and operable by the member when in neutral position to allow fluid flow to the brake device and to shut off fluid flow to the other devices, and when the member is in forward or reverse position to shut off fluid flow to the brake device and to permit fluid flow to the other devices.

5. In a transmission for motor vehicles, a power shaft, a driven shaft, planetary gearing adapted to connect said shafts in drive relation, fluid operable devices for selectively conditioning the gearing to drive in one of a plurality of gear ratios, a tail shaft, coupling means shiftable to connect said driven shaft and said tail shaft in relation for forward or reverse drive or neutral, a fluid operable brake device for the driven shaft, a pressure fluid system leading to said devices and the brake device, a sleeve valve in the system leading to the brake device, a shift rail carrying a fork for operating the clutch means, spring means operable by the sleeve valve to actuate the shift rail, and driver operated mechanism for shifting said sleeve valve, said sleeve valve having ports opening the fluid system to the brake device when in neutral position and closing the fluid system to the brake device when in forward or reverse positions.

6. In a transmission for motor vehicles, a power shaft, a driven shaft, planetary gearing adapted to connect said shafts in drive relation, a tail shaft, coupling means shiftable to connect said driven shaft and said tail shaft in relation for forward or reverse drive or neutral, a fluid operable brake device for the driven shaft, a pressure fluid system leading to said brake device, a sleeve valve in the system leading to the driven shaft brake device, said sleeve having an internal groove comprised of a narrow inlet section and a wide outlet section, a shift rail carrying a fork for shifting the clutch means, spring means operable by the sleeve valve to actuate the shift rail, an arm engaging said sleeve valve, and driver operable mechanism for actuating said arm, said sleeve valve groove being open to allow fluid flow to the brake device when in neutral position and to shut off fluid flow to the brake device when in forward or reverse positions, the wide section of the groove venting fluid in the brake device when fluid flow in the system is cut off by the sleeve valve.

7. In a transmission for motor vehicles, a power shaft, a driven shaft, planetary gearing including a carrier adapted to connect said shafts in drive relation, a tail shaft, mechanism including coupling means shiftable to connect said driven shaft and said tail shaft in relation for forward or reverse drive or neutral, a fluid operable brake device for the carrier, a fluid operable brake device for the driven shaft, a pressure fluid system leading to said brake devices, a shift rail having a fork for actuating the clutch means and valve means for controlling the fluid system to cut off flow to the carrier brake device in neutral position and to open the fluid system to the carrier brake device in forward or reverse drive positions, a sleeve valve around the rail having an internal groove controlling fluid flow in the system leading to the driven shaft brake device, spring means operable by the sleeve valve for shifting said rail, and driver operable means for shifting said sleeve valve, said sleeve valve groove opening the system to the driven shaft brake device when in neutral position and closing the system to the drive shaft brake device when in forward or reverse drive positions.

8. In a transmission for motor vehicles having a power shaft, a driven shaft, planetary gearing including a carrier adapted to drivingly connect the shafts, a fluid engageable brake device for preventing rotation of the carrier, a pressure fluid system leading to the brake device having a flow control valve therein, actuator means for the brake device comprising nested pistons having relative movement axially, passage means from the exterior of the outer piston to the interior of the inner piston, vent means through the inner piston, and a valve controlling flow through said passage means and carried by the outer piston means.

9. In a transmission having a brake device operable to condition gearing in driving relation between shafts, control means for the brake device comprising a casing, two chambers in the casing connected by two passages, a control valve in one chamber, a pressure fluid system connected with the valve chamber, a pair of telescoped actuator pistons in the other chamber, the outer piston having a flange between the two passages leading to the actuator chamber and a port open to the interior of the inner piston, means limiting relative axial movement of the inner piston in the outer piston, a spring acting to position the pistons in extended relation axially, a valve in the pistons for controlling fluid flow through the port in the outer piston, spring means in the inner piston bearing against and normally closing said valve, said valve being exposed to pressure fluid at the end of the outer piston, and mechanism operable by the inner piston for engaging or releasing said brake device, the control valve being operable to alternately open and close the two passages connecting the chambers.

10. In a transmission for motor vehicles driven by an engine, a power shaft driven by the engine, a driven shaft, planetary gearing adapted to drivingly connect said shafts and having a carrier, a reaction member, a brake device for the reaction member, an overrunning brake between the carrier and the reaction member, a clutch device for connecting the power shaft to the carrier, a pressure fluid system for applying the brake device and the clutch device, a normally open valve in the system controlling fluid flow to the brake device, fluid pressure operated means for holding the brake valve open, a speed influenced valve in the system controlling fluid flow to the clutch device, and means connecting the portion of the system between the clutch and clutch control valve with the said fluid pressure operated means whereby fluid pressure will hold the brake control valve open while the clutch control valve is open.

11. In a transmission for motor vehicles driven driven by an engine having an intake manifold, a power shaft driven by the engine, a driven shaft, planetary gearing adapted to drivingly connect said shafts and having a carrier, a reaction member, a brake device for the reaction member, an overrunning brake between the carrier and the reaction member, a clutch device for connecting the power shaft to the carrier, a pressure fluid system for applying the brake device and the clutch device, a normally open valve in the system controlling fluid flow to the brake device, fluid pressure operated means for holding the brake valve open, a conduit connecting the manifold with the brake device control valve whereby manifold pressure when the engine is idling will close the valve, and means connecting the portion of the system between the clutch device and the clutch control valve with the said fluid pressure operated means whereby fluid pressure will hold the brake control valve open while the clutch control valve is open and the engine is idling.

12. In a transmission for motor vehicles driven by an engine having an intake manifold, a power shaft driven by the engine, a driven shaft, planetary gearing adapted to drivingly connect said shafts and having a carrier, a reaction member, an overrunning brake between the carrier and the reaction member, a brake device for holding the reaction member stationary to effect geared drive through the planetary gearing, a clutch device for connecting the power shaft to the carrier, a pressure fluid system for applying the brake device and the clutch device, normally open valve means in the system controlling fluid flow to the brake device, fluid pressure operated means integral with the brake valve for holding the brake valve means open, a conduit connecting the manifold with the valve means whereby manifold pressure will close the valve means while the engine is idling, a speed influenced valve in the system controlling fluid flow to the clutch, and means connecting the portion of the system between the clutch control valve and the clutch device with the said fluid pressure operated means whereby fluid pressure against the said fluid pressure operated means will hold the brake valve means open to apply the brake device while the clutch control valve is open and the engine is idling.

13. In a transmission for motor vehicles having a power shaft, a driven shaft, planetary gearing including a carrier adapted to drivingly connect the shafts, a fluid operable brake device for the carrier engageable to establish a reduction drive through the gearing, a fluid operable clutch device for connecting the power shaft to the carrier, a pressure fluid system leading to said devices, a valve sleeve traversing the system having ports therein, a hollow valve member open at one end and having two positions to selectively control fluid flow through the sleeve ports to the devices, spring means normally positioning the valve member to connect the system with the clutch device, a solenoid effective when energized to position the valve member to connect the system with the brake device, said hollow valve member having a vent port registering with the brake device ports when the valve is open to the clutch device, electric circuit means connected with the solenoid, and a driver operable switch for controlling the circuit.

14. In a transmission for motor vehicles, a power shaft, a driven shaft, planetary gearing including a carrier adapted to drivingly connect said shafts, a fluid operable one-way brake device for engaging the carrier to establish reduced geared drive through the gearing, a fluid operable clutch device for the gearing engageable to drivingly connect the carrier to the power shaft to establish a higher speed drive, a fluid system connected to the devices, three valves in the system, one of the valves being normally open to connect the system to the brake device, the second valve being normally open to the clutch device, and the third valve controlling flow to the other two valves, and means responsive to engine operating conditions and vehicle speed below a predetermined value for closing the third valve.

15. In a transmission for motor vehicles, a power shaft, a driven shaft, planetary gearing including a carrier adapted to drivingly connect said shafts, a fluid operable one-way brake device for engaging the carrier to establish reduced geared drive through the gearing, a fluid operable clutch device for the gearing engageable to drivingly connect the carrier to the power shaft to establish a higher speed drive, a fluid system connected to the devices, three valves in the system, one of the valves being normally open to connect the system to the brake device, the second valve being normally open to the clutch device, and the third valve controlling flow to the other two valves and normaly open through one of said two valves to the clutch device, and means responsive to engine operating conditions and vehicle speed below a predetermined value for closing the third valve.

16. In a transmission for motor vehicles driven by an engine having a fuel intake manifold, a power shaft, a driven shaft, planetary gearing including a carrier adapted to drivingly connect said shafts, a fluid operable one-way brake device for engaging the carrier to establish reduced geared drive through the gearing, a fluid operable clutch device for the gearing engageable to drivingly connect the carrier to the power shaft to establish a higher speed drive, a fluid system connected to the devices, three valves in the system, one of the valves being normally open to connect the system to the brake device, a connection between the manifold and brake device valve whereby pressure in the manifold while the engine is idling will move the valve to closed position, the second valve being normally open to the clutch device, and the third valve controlling flow to the other valves and normally open to the clutch device, and means responsive to engine operating conditions and vehicle speed below a predetermined value for closing the third valve.

17. In a transmission for motor vehicles, a power shaft, a driven shaft, planetary gearing including a carrier adapted to drivingly connect said shafts, a fluid operable one-way brake device for engaging the carrier to establish reduced geared drive through the gearing, a fluid operable clutch device for the gearing engageable to drivingly connect the carrier to the power shaft to establish a higher speed drive, a fluid system connected to the devices, three valves in the system, one of the valves being normally open to connect the system to the brake device, the second valve being normally open to the clutch device, and the third valve controlling flow to the other valves and normally open to the clutch device, electrically energized means for closing the third valve, and switch means responsive to engine operating conditions and vehicle speed below predetermined values for closing the electrically energized means.

18. In a transmission for motor vehicles, a power shaft, a driven shaft, planetary gearing including a carrier adapted to drivingly connect said shafts, a fluid operable one-way brake device for engaging the carrier to establish reduced geared drive through the gearing, a fluid operable clutch device for the gearing engageable to drivingly connect the carrier to the power shaft to establish a higher speed drive, a fluid system connected to the devices, three valves in the system, one of the valves being normally open to connect the system to the brake device, the second valve being normally open to the clutch device, and the third valve controlling flow to the other valves and normally open to the clutch device, electrically energized means for closing the third valve, switch means responsive to engine operating conditions and vehicle speed below a predetermined value for closing the electrically energized means, and driver controlled electrically energized means for shifting the second valve into position closing off fluid flow to the clutch device.

19. In a transmission for motor vehicles, a power shaft, a driven shaft, planetary gearing including a carrier adapted to drivingly connect said shafts, a fluid operable one-way brake device for engaging the carrier to establish reduced geared drive through the gearing, a fluid operable clutch device for the gearing engageable to drivingly connect the carrier to the power shaft to establish a higher speed drive, a fluid system connected to the devices, three valves in the system, one of the valves being normally open to connect the system to the brake device, the second valve being normally open to the clutch device, and the third valve controlling flow to the other valves and normally open to the clutch device, electrically energized means for closing the third valve, switch means responsive to engine operating conditions and vehicle speed below predetermined values for energizing said electrically energized means, and driver operated means for controlling the electrically energized means.

20. In a transmission mechanism for motor vehicles, a power shaft, a driven shaft, planetary gearing including a gear carrier connected between said shafts, a brake device for engaging said carrier to establish a geared drive between said shafts, a fluid pressure system, and means operated by said system for engaging said brake device with progressively increasing effect to thereby obtain a soft application of said brake device, said means including a piston, means for trapping fluid on one side of the piston to oppose movement of the piston in the direction of said side, and means for releasing the trapped fluid.

21. In a transmission mechanism for motor vehicles, a power shaft, a driven shaft, planetary gearing including a gear carrier connected between said shafts, a brake device for engaging said carrier to establish a geared drive between said shafts, a fluid pressure system, and means operated by said system for engaging said brake device with progressively increasing effect to thereby obtain a soft application of said brake device, said means including spring controlled nested pistons and valve means, said valve means including means for trapping fluid on one side of one of said pistons to oppose motion of the fluid in a brake applying direction and other means for releasing the trapped fluid to permit movement of the piston in a brake applying direction.

22. In a transmission mechanism for motor vehicles, a power shaft, a driven shaft, planetary gearing including a gear carrier connected between said shafts, a brake device for engaging said carrier to establish a geared drive between said shafts a fluid pressure system, and means operated by said system for engaging said brake device with varying pressure, said means comprising a piston, a control valve in the system, conduits connecting the valve to the piston, one conduit conducting pressure fluid to one side of the piston to apply the brake and the other conducting pressure fluid to the other side to tend to release the brake, a second piston nested in the first piston, both said pistons having passageways for conducting fluid from the said other side of the first-mentioned piston, resilient means acting on the second piston in opposition to the fluid pressure on the second piston and holding the passageways in the pistons out of register whereby to trap fluid under pressure on the said one side of the piston, said resilient means being yieldable under fluid pressure acting upon the second piston to cause the passageways to become aligned thereby to conduct the trapped fluid from the said one side of the piston to release the piston for movement in a direction to engage the brake, and means for venting the aligned passageways, said valve being adapted to apply fluid under pressure through one of said conduits to the said one side of the piston and then to close the said one conduit and apply fluid under pressure to the other side of the piston through another of said conduits.

23. In a transmission for motor vehicles, a power shaft, a driven shaft, planetary gearing including a gear carrier connected between said shafts, a brake device for engaging said carrier to establish a geared drive between said shafts, a fluid pressure system, and means operated by said system for engaging said brake device, said means comprising a pair of nested pistons, means for introducing fluid under pressure to one side of one piston, means for introducing fluid under pressure to the other side of said piston, and means in the other of said pair of pistons for trapping and then venting the fluid introduced to said one side of said one piston, whereby to retard the movement of the said one piston when fluid under pressure is introduced to the said other side thereof.

24. A transmission as described in claim 23, the means in the other of said pistons for trapping and then venting the fluid comprising a spring acting to move the said other of said pistons in one direction, and fluid under pressure acting in opposition to the spring, both said pistons having passages which when aligned allow the trapped fluid to escape.

25. In a transmission for motor vehicles, a power shaft, a driven shaft and a tail shaft, change speed gearing adapted to connect said power and driven shafts, pressure fluid operated devices controlling the operation of said gearing for different ratio drives, shiftable selector mechanism including positive clutch means having teeth engageable to effect forward or reverse drive from the driven shaft to the tail shaft, a synchronizer device for holding the driven shaft stationary, a driver operated shift member for conditioning said mechanism for forward or reverse drive, a fluid pressure system connected to operate said devices, and valve means operated by said shift member and having a porting arrangement which permits fluid flow to the synchronizer device when the member is in neutral position and shuts off fluid flow to said synchronizer device and vent said device to the atmosphere after the teeth of said clutch means have been shifted into abutment when the member is shifted to forward or reverse position.

26. In a transmission for motor vehicles, a power shaft, a driven shaft and a tail shaft, planetary gearing including a carrier adapted to connect said power and driven shafts, a brake device for the carrier, shiftable selector mechanism including positive clutch means having teeth engageable to effect forward or reverse drive from the driven shaft to the tail shaft, a synchronizer device for holding the driven shaft stationary, a driver operated shift member conditioning said mechanism for forward or reverse drive, a fluid pressure system for operating said synchronizer device and said brake device, and valve means operated by said member and having ports so arranged as to permit fluid flow to the synchronizer device when the member is in neutral position and shut-off fluid flow to said device when the member is shifted to forward or reverse position and vent said synchronizer device to the atmosphere after the teeth of said clutch means have been shifted into engagement and to permit fluid flow to said brake device to apply the same after the member is shifted to forward or reverse position.

27. In a transmission for motor vehicles, a power shaft, a driven shaft, planetary gearing including a carrier adapted to drivingly connect the shafts, a fluid operated brake device for preventing rotation of the carrier to establish geared drive, operated means for said brake device, a fluid operated clutch device for the gearing engageable to establish a higher speed drive, a fluid system including valve means for controlling operation of said clutch device, fluid passage means leading to and from said brake device operating means, and a valve device for controlling the engagement and release of said brake device, said valve device having a vent and comprising a valve member slidable in a chamber to open and close said passages and vent, an element slidable in said chamber and a spring normally holding said element out of relationship with said vent, said element being moved into such relationship under the control of said clutch control valve means so that is cooperates with the first-mentioned valve member to restrict fluid flow through said vent and delay full release of the brake device until the clutch device is sufficiently engaged to take up the motor torque upon shift-up from geared drive to the higher speed drive.

FOREST R. McFARLAND.

REFERENCES CITED

The following references are of record in the file of this patent:

UNITED STATES PATENTS

| Number | Name | Date |
|---|---|---|
| 2,008,869 | Leoni | July 23, 1935 |
| 2,074,781 | Duffield | Mar. 23, 1937 |
| 2,184,533 | Sinclair | Dec. 26, 1939 |
| 2,193,305 | Thompson | Mar. 12, 1940 |
| 2,221,180 | Cotterman | Nov. 12, 1940 |
| 2,282,949 | Dolza | May 12, 1942 |
| 2,319,388 | Cotterman | May 18, 1943 |
| 2,324,713 | McFarland | July 20, 1943 |
| 2,332,593 | Nutt et al. | Oct. 26, 1943 |
| 2,355,427 | Duffield | Aug. 8, 1944 |
| 2,397,634 | Voytech | April 2, 1946 |
| 2,402,248 | Hale | June 18, 1946 |
| 2,407,289 | La Brie | Sept. 10, 1946 |

FOREIGN PATENTS

| Number | Country | Date |
|---|---|---|
| 356,094 | Great Britain | Sept. 3, 1931 |